(12) United States Patent
Ouksel et al.

(10) Patent No.: US 7,840,353 B2
(45) Date of Patent: Nov. 23, 2010

(54) METHOD AND SYSTEM FOR MANAGING A NETWORK OF SENSORS

(75) Inventors: Aris Ouksel, Oak Park, IL (US); Lin Xiao, Chicago, IL (US)

(73) Assignee: The Boards of Trustees of the University of Illinois, Urbana, IL (US)

( * ) Notice: Subject to any disclaimer, the term of this patent is extended or adjusted under 35 U.S.C. 154(b) by 57 days.

(21) Appl. No.: 11/914,466

(22) PCT Filed: May 17, 2006

(86) PCT No.: PCT/US2006/019034

§ 371 (c)(1),
(2), (4) Date: Nov. 15, 2007

(87) PCT Pub. No.: WO2006/124971

PCT Pub. Date: Nov. 23, 2006

(65) Prior Publication Data

US 2009/0055691 A1    Feb. 26, 2009

Related U.S. Application Data

(60) Provisional application No. 60/681,665, filed on May 17, 2005.

(51) Int. Cl.
*G05D 1/02* (2006.01)

(52) U.S. Cl. ............... 701/300; 709/220; 709/221; 714/48; 714/E11.023

(58) Field of Classification Search ............... 701/33, 701/34, 214, 225, 300; 714/48, E11.023; 709/220, 221, 223; 703/6
See application file for complete search history.

(56) References Cited

U.S. PATENT DOCUMENTS

| | | |
|---|---|---|
| 6,735,630 B1 | 5/2004 | Gelvin et al. |
| 2002/0055924 A1 | 5/2002 | Liming |
| 2003/0040272 A1 | 2/2003 | Lelievre et al. |
| 2003/0063585 A1 | 4/2003 | Younis et al. |
| 2003/0153338 A1 | 8/2003 | Herz et al. |
| 2004/0193707 A1 | 9/2004 | Alam et al. |
| 2005/0076054 A1 | 4/2005 | Moon et al. |
| 2005/0080924 A1 | 4/2005 | Shang et al. |
| 2005/0138200 A1 | 6/2005 | Liu et al. |
| 2005/0255848 A1 | 11/2005 | Cohen |
| 2006/0072014 A1* | 4/2006 | Geng et al. ............... 348/159 |

OTHER PUBLICATIONS

Govindan et al., "Multi-Dimensional Range Queries in Sensor Networks", pp. 63-75, http://compilers.cs.ucla.edu/emsoft05/LiKimGovindanHong03.pdf, Website last visited Nov. 9, 2007.

* cited by examiner

*Primary Examiner*—Gertrude Arthur Jeanglaud
(74) *Attorney, Agent, or Firm*—Ed Guntin; Guntin Meles & Gust, PLC

(57) ABSTRACT

A system and method are disclosed for managing a network of sensors (100). A system that incorporates teachings of the present disclosure may include, for example, a sensor (102) belonging to the network of sensors operating in a geographic space having a controller (210) that manages a sensing device (204). The controller can be programmed to locate (302) itself in the geographic space, and assign (304) itself according to its location a zone within a portion of the geographic space and a corresponding data range for storing sensed information. Additional embodiments are disclosed.

20 Claims, 5 Drawing Sheets

100

200

400

500

600

700

METHOD AND SYSTEM FOR MANAGING A NETWORK OF SENSORS

CROSS-REFERENCE TO RELATED APPLICATIONS

This application is a §371 national stage entry of International Application No. PCT/US2006/019034, filed May 17, 2006, which claims priority to U.S. Provisional Application No. 60/681,665, filed May 17, 2005, both of which are hereby incorporated by reference.

FEDERAL FUNDING

The present invention is funded in part by the National Science Foundation Grant no. IIS0326284. The U.S. government has certain rights in the invention.

FIELD OF THE DISCLOSURE

The present disclosure relates generally to sensing systems, and more specifically to a method and system for managing a network of sensors.

BACKGROUND

Prior art systems have not managed to provide a cost effective and realizable method for query processing in networks having sensors which all or in part can move about the network.

A need therefore arises for a method and system for managing a network of sensors.

DETAILED DESCRIPTION

Figure 1:
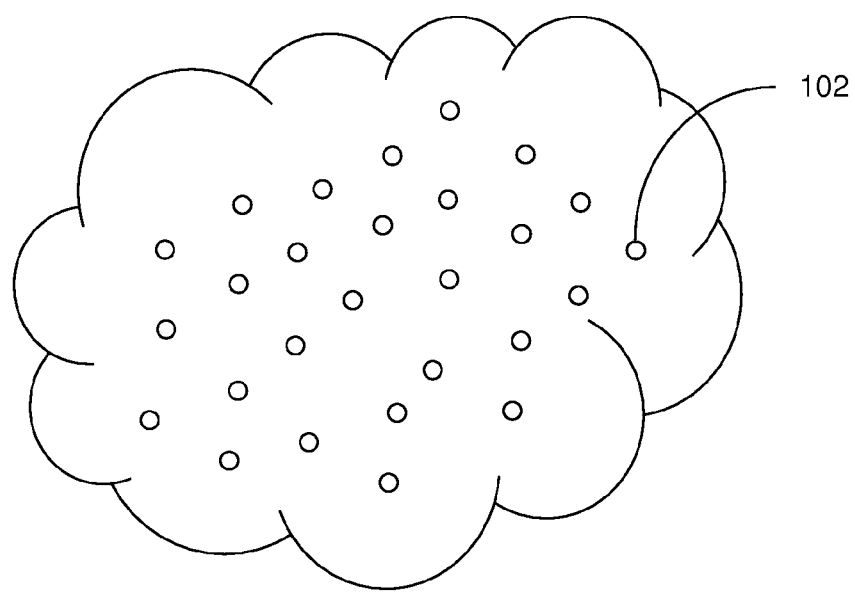
FIG. 1 depicts an exemplary diagram of a network of sensors (NOS)

FIG. 1 illustrates an exemplary embodiment of a network of sensors (NOS) 100 operating in a geographic space. Some of the sensors 102 in the NOS 100 can be mobile within the geographic space, while others can be fixed to a particular location. The sensors 102 can communicate among each other wirelessly or with wired interfaces. Accordingly, signals exchanged between sensors 102 can be for example electrical, electromagnetic, optical, or acoustic signals.

Figure 2:
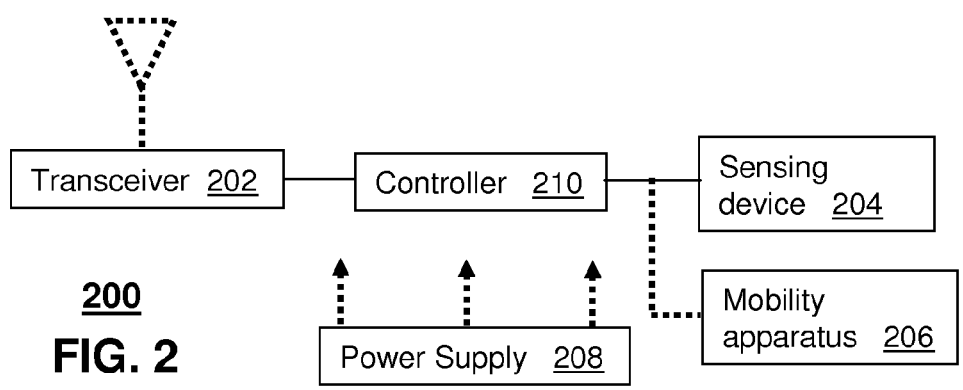
FIG. 2 depicts an exemplary block diagram of a sensor of the NOS.

FIG. 2 depicts an exemplary embodiment of a sensor 102. The sensor 102 can comprise a transceiver 202, a sensing device 204, a mobility apparatus 206 (only in mobile sensors), a power supply 208, and a controller 210. The transceiver 202 can utilize common technology for wireless and/or wired communications with other sensors 102. Wireless communications can be short range such as Bluetooth, WiFi, Zigbee, Infrared, or acoustical, or long range such as cellular (GSM, CDMA, UMTS, and so on), or WiMax. Wired communications can be accomplished by way of a POTS (Plain Old Telephone Service), xDSL, cable, or other common wired interface for transporting digital traffic over for example an Internet backbone.

The sensing device 204 can utilize common technology for measuring any number of recordable information types among them including without limitation environmental information (e.g., chemical, radiological, biological, temperature, humidity, barometric pressure, etc.), medical information (hospital room conditions, diagnostic readings such as blood pressure, heart rate, temperature, etc.), public information (crowd activity, traffic conditions, public transportation usage, etc.), instrumentation information (diagnostics, telemetry, etc.), commercial information (commercial transport, logistics, distribution, inventory, factory performance, etc.), audio information (wiretaps, wireless tap, sound pollution reading, etc.), image information (still images, moving images, image processing, etc.), and location information (GPS reading, relative location between sensors, movement of a monitored target, etc.).

There are innumerable sensing technologies that can be used in the present disclosure for recording information which can be used in a commercial setting, government setting (e.g., Homeland Security), or consumer setting just to name a few.

For mobile sensors 102, the mobility apparatus 206 can represent a servo motor driven by electrical pulses to direct the sensor in the NOS 100 for sensing recordable information types at various locations in the geographic space. The power supply 208 supplies energy to the sensor by way of a common utility power source for fixed sensors, or from a portable power source such as rechargeable power, or solar power for long-term use. The controller 210 can comprise common computing technology such as a microprocessor, digital signal processor, or other computing technology that can manage the operations of the sensor 102 according to the present disclosure.

Figure 3:
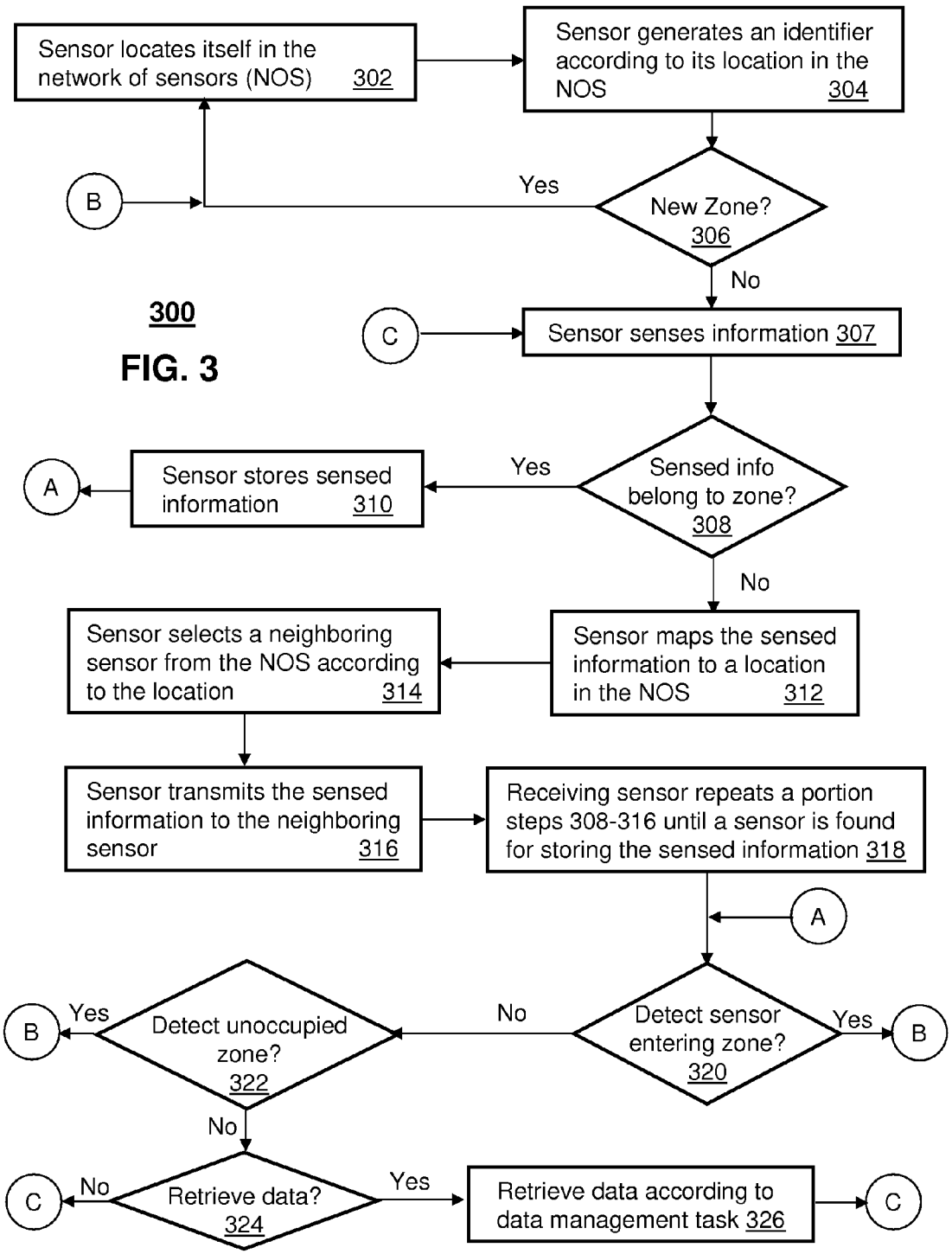
FIG. 3 depicts a method operating in sensors of the NOS.

The present disclosure describes among other things a means for synergistically integrating localization with data space partitioning in the NOS 100, thus allowing a self-organizing distributed index structure to emerge dynamically across the network from the interaction of the sensors 102. FIG. 3 depicts a method 300 that summarizes operations in each of the sensors 102 of the NOS 100. Following the presentation of method 300, a detailed description will be provided with a number of algorithms that can be applied to method 300.

Method 300 begins with step 302 in which a sensor 102 locates itself in the NOS 100. This step can be accomplished by any location tracking technique. For example, a wireless sensor 102 can exchange wireless signals with its neighbors to derive ranging information which it can use to determine its location in the geographic space. The ranging information can be derived from signal strength measurement techniques such as RSS (Receive Signal Strength) and TOA (Time of Arrival). With the ranging information and applying common localization techniques, the sensor 102 can determine its relative location to its neighbors. Neighboring sensors of the NOS 100 can also provide their location in the geographic space if known. With localization information and the sensor's 102 relative location to its neighbors, the sensor 102 can determine its location in the geographic space. If the margin of error associated with the location determined by the sensor 102 exceeds an error threshold, the sensor 102 can apply a refined localization method such as mass spring optimization to improve the margin of error (as will be discussed later).

Once the sensor 102 has located itself, it proceeds to step 304 where it maps the location to an identifier in the NOS 100. The identifier can indicate among other things a self-assigned zone corresponding to a portion of the geographic space, a data range for storing information sensed by the sensor, and a data management task. The information sensed by the sensor 102 can have attribute values that form a tuple. The data range defines a range of attribute values for storing said tuples. The data management task self-assigned by each of the sensors 102 can form a data aggregation structure in the NOS 100 in order for a computing device coupled thereto to efficiently retrieve tuples from the NOS 100.

In the case of mobile sensors 102, the sensor 102 checks in step 306 whether it has transitioned to a neighboring zone. This determination can take place by periodically processing ranging information with neighboring sensors in order to track its location in the geographic space. If a sensor 102 detects it has moved into a neighboring zone, it repeats steps 302-304 to determine a new identifier which in turn provides a delineation of a new zone, data range and data management task. If the sensor 102 remains in its zone, it proceeds to step 307 where it senses information according to the sensing abilities of the sensing device 204.

In step 308, the sensor 102 determines if the sensed information is within its data range. If it is, the sensor 102 proceeds to step 310 where it stores it in its memory. From step 320, the sensor 102 proceeds to step 320 where it monitors whether another sensor has entered its zone. This event can be detected by periodically updating the aforementioned ranging information derived from neighboring sensors. If another sensor is detected in the sensor's zone, the sensor 102 proceeds to steps 302-304 thereby generating a new identifier that effectively splits a portion of the original zone to accommodate the presence of another sensor and identifies a new data range and corresponding data management task. If a neighboring sensor is not detected in the sensor's zone, the sensor proceeds to step 322 where it checks for a neighboring sensor departing from its zone. If such an event is detected and the sensor 102 is tasked with the responsibility of managing the unoccupied zone, the sensor 102 proceeds to steps 302-304 to generate a new identifier that effectively merges the sensor's zone with the unoccupied zone and generates a new data range and data management task.

If the neighboring sensors remain in their respective zones, the sensor 102 proceeds to step 324 where it checks for a request generated by a computing device or neighboring sensor for retrieving sensed information (or tuples) from a portion of the NOS 100. If no request is detected, the sensor 102 proceeds to step 307 where it continues to sense more information. If on the other hand a request is detected, the sensor 102 retrieves sensed information according to its data management task in step 326 and supplies said information to the requesting device. The data management task can be a subset of a data aggregation structure embodied in a portion of the NOS 100 that reduces a cost for the computing device to retrieve a portion of information sensed by the sensors 102 of the NOS 100.

The data management task can be for example data aggregation statistics (e.g., average temperature among a number of zones, total count of events between said zones, etc.). Consequently, the data management task self-assigned by each sensor 102 can save the computing device or other sensors processing time and retrieval time among other things. Referring back to FIG. 3, once the sensed information has been delivered to the computing device in step 326, the sensor 102 can proceed to step 307 to continue sensing more information.

Referring again to step 308, if the sensor 102 detects that the sensed information does not belong to its data range, it proceeds to step 312 where it maps the sensed information to a location in the geographic space of the NOS 100 as a function of the values of the sensed information. In step 314, the sensor 102 can select a neighboring sensor from the NOS 100 according to a lowest distance between each of the neighboring sensors and the location given to the sensed information. That is, the neighboring sensor selected can be the one closest to the location given to the sensed information in step 312. In step 316, the sensor 102 transmits the sensed information to the selected neighboring sensor. In step 318, the receiving sensor repeats a portion of steps 308-316 until a sensor in the NOS 100 is found having a data range corresponding to the sensed information.

In other words when the neighboring sensor receives the sensed information, it compares the values of the sensed information with its data range. If it matches its range, it stores the sensed information in step 310; otherwise, it selects a neighboring sensor to relay the sensed information thereto. The process continues until the sensed information converges at a sensor that has assigned itself a data range for storing the sensed information.

A detailed description follows that illustrate implementations of method 300. As noted in step 304, each sensor 102 assigns itself a zone, whose identifier characterizes the data range stored at the sensor. An index structure can be exploited to efficiently perform queries and data aggregations. The basic idea of indexing is to partition a d-dimensional data space into a finite number of subspaces which will exhaust the search space, and then assign those subspaces to sensors 102 that manage the storage and query posed on them. The goal of indexing is to obtain an efficiently optimal storage and search cost for data tuples across the NOS 100. In view of this goal, indexing can be used to map the partition of a data space onto a physical space where the sensors 102 are located. Each sensor 102 obtains a subspace of the data space and is responsible for storage, maintenance, and query of that subspace. For simplicity, the NOS 100 environment is assumed to cover a bounded two-dimensional rectangular area. The extension to a three or more dimensional area of other shapes (e.g., circular, spherical, or polygons) is straightforward so further discussion is not covered by the present disclosure.

Suppose a relation R has attributes $R_1, R_2, \ldots, R_k$, each $R_i$ taking its value from a bounded but not necessarily finite domain $D_i$. Suppose an index is to be built along attributes $R_1, \ldots, R_d$ of relation R, referred to herein as index attributes. For convenience, the terms index attributes and attributes will be used interchangeably from herein.

To create a uniform index system that can be applied universally to any relation with arbitrary property domains, each index attribute can be normalized to [0, 1). Let the d-dimensional uniform data space (hypercube) $U^d = [0, 1)^d$ be partitioned into subspaces of hyper-rectangles, defined as data zones. Each data zone is uniquely represented by an identifier I, which is a binary sequence with length l: $i_1, i_2, \ldots, i_l$. l can sometimes be referred to as a level of a data zone.

A partition of the data zone along one dimension which divides it into two equal data zones is defined as a split. l denotes the number of times $U^d$ has split in order to obtain the data zone I. A data zone is always split cyclically along each of its index dimensions.

The tuple $x=(x_1, x_2, \ldots, x_d)$, $0 \leq x_i < 2^{l_i}$ gives the integer coordinates of the data zone calculated as following:

$$x_j = i_j * 2^{l_j} + i_{j+d} * 2^{l_j - 1} + \ldots + i_{j+(l_j - 1)*d} * 2^0, l_i$$

$$= \left\lceil \frac{l - i + 1}{d} \right\rceil, 1 \leq i \leq d$$

$l_i$ being the number of times this data zone has been split along i-th axis.

A data zone with identifier I, denoted D(I), is bounded by $$[L_1, U_1) \times [L_2, U_2) \times \ldots \times [L_d, U_d),$$

$$L_i = \frac{x_i}{2^{l_i}},$$

$$U_i = \frac{x_i + 1}{2^{l_i}}$$

The key of a data tuple $t=(t_1, t_2, \ldots, t_d)$ of relation R, is calculated by interweaving the bits of $t_i$'s binary representation $t_{i,1} t_{i,2} \ldots t_{i,max}$.

Each sensor 102 obtains an identifiers after joining the NOS 100. The identifier I is determined by the sensor's joining location and may change when sensor moves. Note this identifier is not intrinsic to the sensor's 102 own properties, it is calculated from sensor's locations or location estimation after interaction with other sensors.

Suppose a sensor n is assigned identifier I. All data tuples whose keys are prefix of I are mapped to sensor n. Sensor n is responsible for the storage, maintenance, and query of those tuples.

The foregoing discussion described a d-dimensional data space and data zone. What follows is a description of an exemplary 2-dimensional physical space in which sensors 102 operate. A physical space refers to the geographic space encompassing the NOS 100. A physical space is also partitioned into subspaces called zones referred to earlier by method 300. Thus a zone space is the set of subspaces formed as a result of partitioning the physical space.

Figure 4:
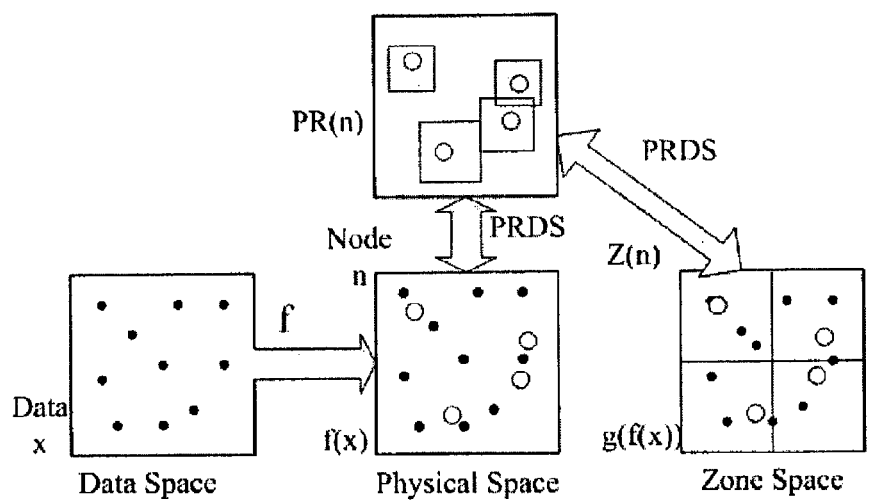
FIG. 4 illustrates a mapping between a data space, physical space, a position region and zone.

Let f be a mapping from the data space to the physical space, and g a mapping from the physical space to the zone space. By this mapping, physical space is also partitioned into subspaces by sensors 102. Given a tuple X in the data space, the composition of mappings g(f (X)) determines the sensor (zone) responsible for its management. FIG. 4 illustrates the one-to-one mapping between the data region and zone with the same identifier I as defined earlier.

A zone Z(I) is given by $[L_x, U_x) \times [L_y, U_y)$, where $$L_x = I_x / 2^{l'}, U_x = (I_x + 1) / 2^{l'}, \text{ and}$$

$$L_y = I_y / 2^{l-l'}, U_y = (I_y + 1) / 2^{l-l'},$$

$$l' = \left\lceil \frac{l}{2} \right\rceil \cdot I_x \text{ and } I_y$$

are the x and y components of I. l' and l–l' are their lengths respectively.

Figure 5:
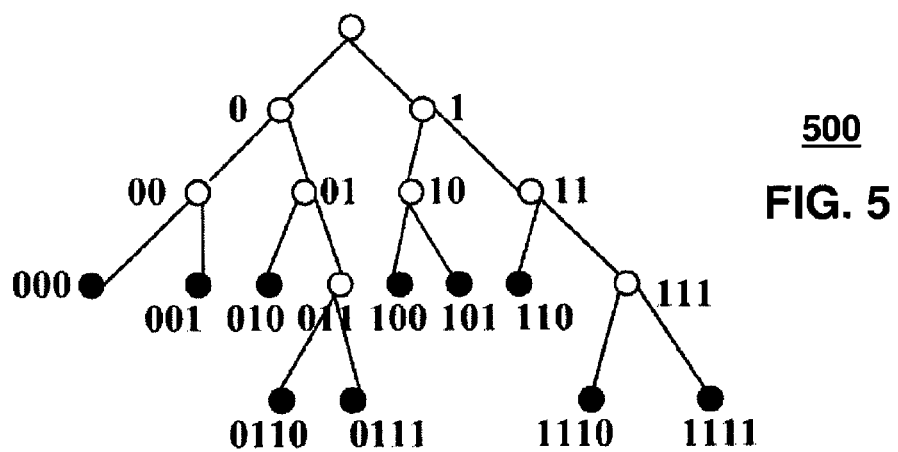
FIG. 5 depicts a virtual tree decomposition.

The space partition can be represented by a virtual tree's decomposition as shown in FIG. 5, referred to herein as the identifier tree. The binary decomposition process induces a partitioning of the data space into zones represented by the leaves of the tree. The paths from the root to the leaves of the tree form the identifiers of the zones. The partitioning of the space stops when a zone has exactly one sensor 102. A sensor 102 acquires the identifier of its zone.

Suppose for example that in the 2-dimensional case (d=2) where the domains are: $D_1=[0,500)$, and $D_2=[0,200)$. A tuple t=(375,50) will be normalized to (375/500, 50/200), which is represented in binary form by (0.11, 0.01). The key of t, denoted by k(t), can be calculated by interweaving the bits cyclically from each dimension. This results in k(t)=1011.

The data zone 11 represents data in the range of $$\left[\frac{1}{2}, 1\right) \times \left[\frac{1}{2}, 1\right) \times [0, 1).$$

Accordingly, the two-dimensional physical space covered by zone 11 is delineated by $$\left[\frac{1}{2}, 1\right) \times \left[\frac{1}{2}, 1\right).$$

The level of both the data zone and zone 110 is 2.

A sensor 102 stores all the events mapped to its assigned zone's identifier. The zone is a rectangle in the physical space, while sensing range is often circular. The justifications for selecting rectangular zones are for simplification of computation as well as avoidance of ambiguity. Circular zones will have to overlap with each other to ensure data coverage of all events which creates ambiguity as to where an event should be stored.

Two sensors are called neighbors if they are within each other's communication range c. The position region of a node n, denoted by the function PR(n), is defined as a rectangle enclosing the likely location of n. Since the exact positions of sensors 102 may not be known, their positions are approximated by their position regions at a given state of the network. Sensors 102 perform the dual action of calculating their position region based on the distances of node n to its neighboring nodes and then delineating node n's new zone boundary by selecting the neighbor with which n will split its zone. The distance is obtained by ranging, which measures the distance between two nodes within a transmission range.

The foregoing method is applied to each sensor 102 and requires only local interactions. For the same reasons as those stated above for zones, position regions are chosen as rectangles. FIG. 4 illustrates the mapping between a position region and zone (also referred to as position region data space or PRDS).

The following model assumptions are made as a precursor to describing PRDS: (i) the NOS 100 is connected all the time regardless of the mobility of sensors 102 or a power shift. This is helpful in the mapping between data and location, and for the validity of query processing; (ii) a small fraction of sensors 102 are equipped with GPS (Global Positioning System) receivers or other location devices; and (iii) sensors 102 without GPS or other positioning capabilities are equipped with ranging devices to estimate their distance to other sensors within its communication range. Each sensor 102 is able to share its identifier and position information with its neighbors. In the descriptions that follow, the term sensor 102 and node are used interchangeably.

With these assumptions in mind, PRDS as applied to each sensor 102 proceeds as follows: given a new node, say n, that is unaware of its position, its position region is first initialized to be the whole space. The ranging distance to each of its neighbors enables the node to determine the rectangles bounding both n and its neighbors' position regions. The intersection of all these bounding rectangles becomes the new position region (PR) for node n. The stabilization of position region for node n can take several rounds.

After calculating PR(n), one of n's neighbors is selected to have its zone split and one of the partitions assigned to n (recall step 320 of FIG. 3). Each sensor 102 determines its neighbor and then performs the appropriate data space partitioning. The following pseudo-code describes the foregoing method as applied to each sensor 102.

1. If node n is aware of its own position $(p_x, p_y)$, PR(n) is $[p_x, p_x] \times [p_y, p_y]$; EXIT, else proceed to 2.
2. Initialize PR(n) to the whole physical space $[0,m) \times [0,n)$
3. For each neighbor $n_i$ of n, find $PR(n,n_i)$ and intersect it with the whole physical space:

$PR(n,n_i) = [PL_x(n_i) - d(n,n_i), PU_x(n_i) + d(n,n_i)) \times [PL_y(n_i) - d(n,n_i), PU_y(n_i) + d(n,n_i)) \cap [0,m) \times [0,n)$ 4. 
$$PR(n) = \bigcap_{i=1}^{deg(n)} PR(n, n_i)$$

5. For each neighbor $n_i$ of n, $PRC(n,n_i) = PR(n) \char`\^ PZ(n_i)$. Select the $n_i$ with the largest $PRC(n,n_i)$ as a splitting partner
6. Split $n_i$'s zone Z(I) until two zones Z(I1) and Z(I2) intersecting PR(n) and $PR(n_i)$ are obtained. Assign n and $n_i$ the enclosing zones Z(I1) and Z(I2), respectively The local data space partitioning phase begins when a stable position region is obtained. At this time, one of n's neighbor is selected to have its zone split into two sub-zones, one of which is assigned to n while the other remains at the neighbor. The method applied to each sensor 102 results in both selection and splitting. Different policies can be deployed in selecting the node whose zone will be split. One such policy as disclosed in the pseudo-code selects the neighbor whose zone completely encloses or has the largest overlapping area with n's position region. The message cost of this method is O(deg*c), where deg is the sensor's 102 out degree and c is a constant indicating the number of times for steps 3 and 4 to be repeated.

Figure 6:
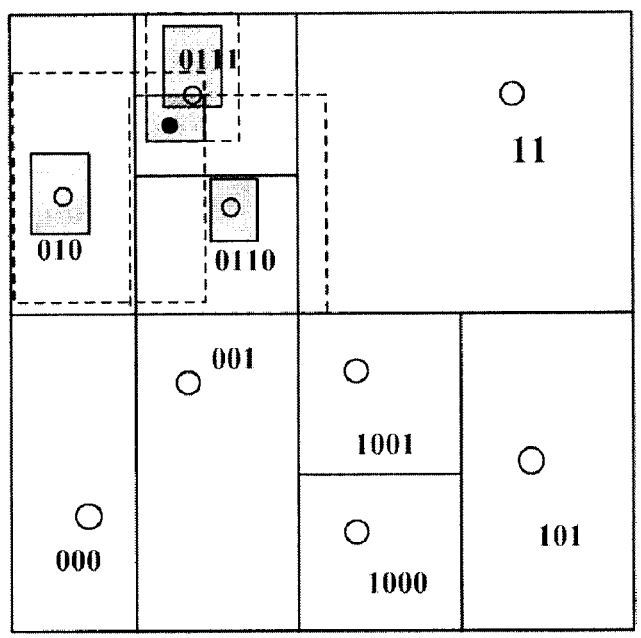
FIG. 6 illustrates the computation of a function PR(n)

FIG. 6 illustrates the computation of PR (n). The blackened node in FIG. 6 represents node n. It has three neighbors identified 010, 0111 and 0110 respectively, represented by hollow nodes. The shadowed rectangle around each neighbor shows its position region. The solid line rectangle around n represents PR(n). The policy adopted in the present example is as follows.

If n's position region intersects with multiple physical-zones, this policy selects the neighbor node $n_i$ whose physical-zone has the highest probability to include the new node n. An alternative is to select the neighbor with the largest zone area still intersecting n's position region. Yet another policy is to choose the zone with the largest data load satisfying the splitting requirements in order to help balance the load and relieve hot spot situations. Another hybrid approach is one that combines all the three approaches into a single fine-tuning algorithm that will enable balancing the trade-offs between load, space coverage, and/or geographic information preservation, according to the need of the application and the distribution of data.

In the case of a mobile node, readjustment will be invoked when its current position region is disjoint with the zone it manages. This will result in less frequent updates to the indexing structure. An alternative is to readjust as soon as the node moves out of its zone. Accordingly, this can result in more frequent updates to the indexing structure.

Localization imprecision incurred in the foregoing approach can be classified as two classes of errors.

1. First-class error $E_1$ (outbound error). This error is the distance of the actual position of a node from its position region. If the actual position is properly contained in its position region, the first class error is then zero. The first-class error represents the accuracy of the localization approach.
2. Second-class error $E_2$ (inbound error). This error indicates how far the node's actual position is from its position region borders. This error can be represented by the ratio of the node's position region size over zone size. The second-class error represents the granularity of the localization approach.

The measured noise can be assumed to be white Gaussian. The standard deviation of measured noise can be assumed to be proportional to the distance between two sensors i and j. Let $e_0$ be the variance of the measured error over a unit distance. Suppose position information propagates from node $n_0$ reaching node $n_k$ in k hops. Let d $(n_i, n_{i+1})$ be the measured distance between node $n_i$ and $n_{i+1}$ for $0 \leq i < k$. The accumulated measured noise $E_0^k$ at node $n_k$, also white Gaussian, is $$e_0 * \sum_{i=0}^{k-1} d(n_i, n_{i+1}).$$

Next the two classes of errors described above are considered. Generally, let the angle between $\overrightarrow{d(n_i, n_i+1)}$ and x-axis be $\theta(n_i, n_{i+1})$. The accumulated second-class error is given by:

$$E_2(n_k) = \sum_{i=0}^{k-1} d(n_i, n_{i+1}) * (1 - \cos\theta(n_i, n_{i+1}))$$

A first-class error occurs when the PR function fails to enclose the node. It occurs in those rare cases where the accumulated second-class error is lower than the accumulated measured error. A first-class error $E_1(n_k)$ is given by $$E_1(n_k) = \min[0, E_2(n_k) - E_0(n_k)]$$

$$= \min\left\{0, \sum_{i=0}^{k-1} d(n_i, n_{i+1}) * (1 - \cos\theta(n_i, n_{i+1}) - e_0^k\right\}$$

Suppose the current PR(n) covers n's exact location. Then the probability of a newly calculated $PR'(n,n_k)$ not enclosing n is the probability: $Pr(E_1^k(n) > 0)$. For an arbitrary node n, let the average number of k-hop neighbors that have position information be Num(i). It occurs in those rare cases where the accumulated second-class error is lower than the accumulated measured error. The probability of n having a positive $E_1$ from all its potential sources of position information is:

$$Pr(E_I(n) > 0) = \sum_{i=1}^{D} Pr(E_I^i(n) > 0 * Num(i)$$

The stability convergence property is satisfied with a probability of at least $1-Pr(E_I(n)>0)$. This property can be proven by:

$$Pr(PR_t(n) \cap PR_t(n,n_k)=\emptyset) < Pr(E_I(n)>0)$$

That is, the probability of a disjoint intersection is actually smaller than the probability of having a positive $E_I$, because $PR_{t'}(n,n_k)$ may still intersect $PR_t(n)$ even if it does not include n. From previous discussion and experimental observations, $E_I$ remains zero with a very high probability (>99%). Additionally, even in situations when $E_I$ is positive with a certain probability, the probability of a disjoint intersection $Pr(PR_t(n) \cap PR_{t'}(n,n_k)=\emptyset)$ is lower. As a result, the convergence property is satisfied with a higher probability.

The foregoing method correctly and efficiently localizes sensors 102 and partitions the data space given an initial core of at least 15% to 20% location-aware sensors 102. Its performance degrades when the size of the initial core falls below 15%. The position region PR(n) obtained by the foregoing function may not be sufficiently refined to narrow selection to a single neighbor. The neighbor with the largest overlapping area with PR(n) may not be the correct one, as its zone may not cover node n. This imprecision may in turn cause an incorrect zone assignment.

An adaptive scheme can be used to deal with situations where the size of the initial core is less than 15% in two phases. In phase I each node n runs a version of the method described above to determine its position region PR(n). If PR(n) is contained in one its neighbors' zones with a high probability or confidence, a split of this zone ensues and the algorithm terminates. On the other hand, if no such neighbor exists, instead of picking the neighbor whose zone has the largest overlapping area, phase II is triggered. Node n sets its initial position to be the center point of PR(n) obtained in phase I, and then its actual position is refined by iteratively interacting with some of its neighboring nodes acting as beacons. The resulting position is mapped to an existing zone, which then gets partitioned such that each sensor manages the data associated with its mapped zone.

Centralized or flooding-based location refinement algorithms in ad-hoc networks do not scale and are inefficient. A distributed re-adjustment algorithm can be driven by a classic force-based relaxation method such as mass-spring optimization that locally minimizes the least square errors to refine the positions of sensors 102 unassigned to zones. The distributed version relies only on local interactions with neighboring sensors, as in the algorithm described earlier. This ensures that the scalability and message efficiency achieved in phase I are also preserved in phase II.

In phase II each sensor 102 has an "assigned" flag to indicate zone assignment. This flag is set to 1 for all nodes successfully localized and assigned a zone; otherwise, its values remains 0. Nodes whose "assigned" flags remains zero after a timeout will proceed with phase II, which resets its location $P_n$ as the center of its PR(n) obtained in phase I and broadcasts a phase-II message to its neighbors. Its neighbors respond with their own estimated position $P_n^i$ calculated from their position regions. The node then uses both $P_n$ and $P_n^i$ as well as the ranging distance $D(n,n_i)$ to pinpoint its location.

Suppose for example the direction from $P_n$ and $P_n^i$ is represented by unit vector $\overrightarrow{d(n,n_i)}$. The force $\overrightarrow{F(n,n_i)}$ in the direction of $d(n,n_i)$ is then given by $$\overrightarrow{F(n, n_i)} = \overrightarrow{d(n, n_i)}((P_n - P_n^i) - D(n, n_i))$$

The position of node n is adjusted to a weighted displacement drawn in the direction of force $\overrightarrow{F(n,n_i)}$. The new estimated position of n after the adjustment is:

$$P_{n'} = P_n + w * \overrightarrow{F(n, n_i)}$$

The weight w can be determined by various means, and is sometimes set empirically as $\frac{1}{2}m_n$, where $m_n$ is the degree of node n. The convergence of the position calculated from phase II can be rapid. One reason is the preliminary position calculated from partial result in phase I is likely to be close to the actual position.

The pseudo-code for this refined localization method can be described as follows.
1. Phase I localization as described above.
//Phase II begins, assigned is set to 1 if the zone has been assigned
2. While (not assigned) for each assigned neighbor $n_i$ $w=\frac{1}{2}m_n$
3. Compute unit vector between $P_n$ and $P_n^i$ and determine the force in this direction $$\overrightarrow{d(n, n_i)} = (P_n - P_n^i)/\|P_n - P_n^i\| \overrightarrow{F(n, n_i)} = \overrightarrow{d(n, n_i)}((P_n - P_n^i) - D(n, n_i))$$

4. Adjust the position $P_{n'}=P_n+w* \overrightarrow{d(n,n_i)}$
5. If timeout or (adjustment<$\epsilon$) assigned=1
6. $K(n_i)$=identifier of $n_i$ whose zone contains $P_n$, $Z1=K(n_i)$ appends "0", $Z2=K(n_i)$ appends "1", assign Z1 and Z2 to n and $n_i$ The foregoing adaptive approach can be utilized in situations requiring extensive localization such as initialization and those requiring simple localization such as when a new node joins the NOS 100. In the situation of an initialization, because all zones are unassigned, it is possible that quite a few nodes in the NOS 100 cannot decided its zone by phase I, posing the need for phase II. On the other hand, in the case when a "joining" node wants to calculate its position region, and most of its surrounding nodes are settled with stable positions regions of their own, the assignment is often completed in phase I without going into phase II. The complexity of phase II is also bounded by O(deg*M) where M is the maximum number of adjustments allowed in a timeout period.

It is also worth noting that when a large portion of nodes fail or dysfunction concomitantly and location determination is demanded without delay, the foregoing two phase approach can act without requiring an initialization step. It adapts seamlessly to situations that require strenuous localization or to those where only simple location discovery of a node is necessary without reliance on outside control.

The discussion that follows describes a method for query processing requested by computing devices coupled to the NOS 100. A query key, denoted by qk, is the key calculated from a query q to resolve the point and range queries. When resolving a point query, a query key is calculated by interweaving the bits of normalized query attributes in a similar fashion as the key calculation for tuples. When resolving a range query, the query key is calculated as the common prefix of query keys covered by the range of the attributes.

A query q is routed towards all sensors 102 whose zone identifiers are a prefix of the query key. Upon receiving a range query, a node checks if either of the following applies: (1) its current zone identifier is a proper prefix of the query key, or (2) the query key is a prefix of the node's zone identifier. In either case this node is intended as one of the potential result holders which is searched for tuples that match the specified query range.

Each node with a partial query result will deliver data in a reply message back to the destination specified in query q. One simple way to assemble the query result is to do it at the destination node after it has received all individual partial results. Alternatively the result can be aggregated in-network during its delivery to the destination. Detail issues relating to data aggregation will be discussed shortly.

The routing method described above, referred to herein as queryrouting, is invoked when node n receives a query q. The function nexthop is invoked when n needs to determine which of n's neighbors q to forward. The query type is "multi" when q is a multidimensional range query and "single" when q is a point query. For a range query qk is computed as the common prefix of the enclosing values of the range query. The following pseudo-code provides an illustration of the nexthop function.

Function: Nexthop(n, Queryobject q)
1. For each neighbor $n_i$ of n, $\delta(n_i, q) = \sqrt{(n_i.id_x - q.qk_x)^2 + (n_i.id_y - q.qk_y)^2}$
2. next={{$n_i$}|$\delta(n_i,q)$=min($\delta(n,q),\delta(n,q)$)}
3. if next !=n, return(next)
4. else {isCloser=false; i=1
5. while (!isCloser) {send message iterativeBFS(q,n,i) to all neighbors $n_i$ of n if (one isCloserBFS(q,$n_i$,i) messages received from $n_i$ has the value "negative") isCloser=true; i++}}return($n_i$)

Figure 7:
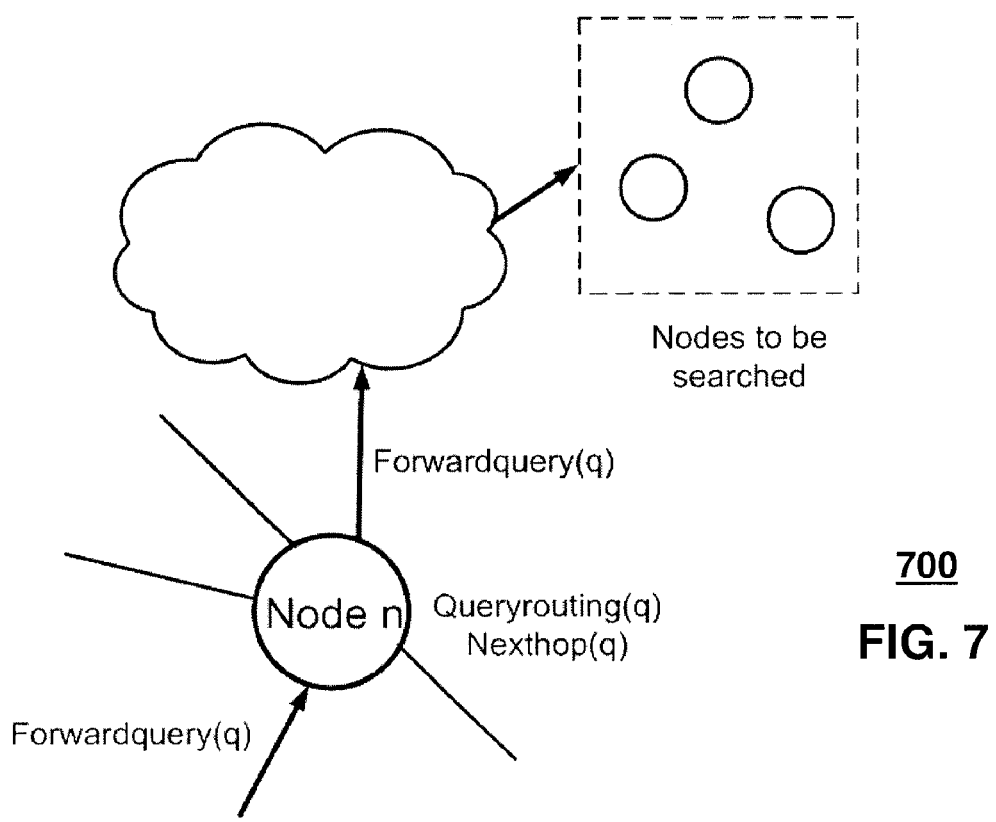
FIG. 7 illustrates greedy forwarding.
Figure 8:
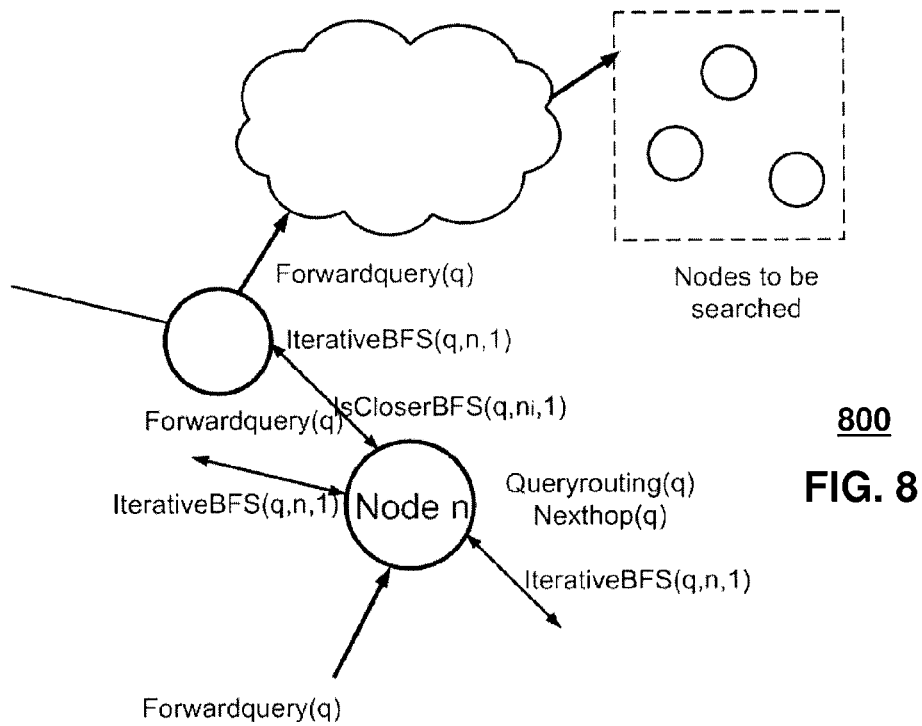
FIG. 8 illustrates iterative breath-first search (BFS)

FIG. 7 shows the execution of both functions in node n for an incoming query q when a closer neighbor can be found. If at any time, a closer node to the query key is not found, alternative method such as iterative-BFS (Breath-First Search) is used to discover the node closest to the destination. FIG. 8 shows the execution of both functions in node n for an incoming query q to start an iterative-BFS discovery when a closer node cannot be found.

If not a single node can be found matching a query key, which indicates a hole in space which is not covered by sensors 102, a special "storage backup" message can be forwarded to its buddy node. A Buddy node is defined as a node's neighbor which shares the longest common prefix in the zone identifier. The buddy node then begins to manage the missing zone in addition to its own zone. Before a node turns itself off, or leaves its current area, its storage of data can also be transferred to its buddy node. If the buddy node discovers that the identifiers of two zones it currently holds only differ in the last bit, a merge will be done and a new zone is created. For example, a merge of zone 1110 and 1111 will produce a new zone 111.

The discussion that follows addresses data aggregation techniques that can be utilized by the NOS 100. Two aggregation techniques are discussed: index-tree driven in-network aggregation, and approximated query aggregation with indices.

It can be shown that identifiers of sensors 102 are obtained by the splitting and assignment of zones, which can be represented by an identifier tree that illustrates these processes. The identifiers are represented by the tree nodes. When a sensor 102 splits its zone and assigns one sub-zone to a joining sensor, two new leaf nodes representing two new identifiers are created and the old identifier held by the splitting node becomes the parent of both new identifiers. So each sensor's zone identifier is represented by a leaf node in the identifier tree. Intermediate or root nodes present old zones that have been further split and do not exist physically any more.

An index tree is a tree structure with nodes represented by identifiers which maintain the order of indices in the NOS 100. It differs from the identifier tree in that an index tree is a real tree with a root, intermediate nodes, and leaf nodes while an identifier tree is "non-existent" physically because it only has leaf nodes.

An index tree is constructed from the leaf nodes in the identifier tree, i.e., the sensor's 102 identifiers. It proceeds by assigning multiple identifiers to some nodes having them serve as intermediate nodes and leaf nodes. For example, a node with identifier 01011 might be assigned an intermediate node of identifier 010. Although the node only manages the storage and retrieval of data mapped to zone 01011, yet it takes up the virtual identifier 010 and is responsible for the aggregation and summary updating for the virtual zone 010.

An illustration begins with static cases where sensors 102 do not move and topology/reachability is stably maintained. A fast and efficient way to construct an index tree is to record split history and let a node keep all its previous identifiers as virtual identifiers. The joining node, upon taking one sub-zone resulting from splitting, records the splitting node as its parent node in the index tree and maintains the link to this parent. Here the index tree is a byproduct of index structure updates in the NOS 100 and does not incur any additional cost (the storage of old identifiers is minimal and can be omitted in consideration). This approach can be referred to as a history approach.

The following function indexTreeUpdateHistory can be invoked when an update to the index takes place. The list of old identifiers are stored in "oldidlist". The term "updatetype" indicates whether the update is a split or a merge (occurring when a node leaves the NOS 100).

Function: IndexTreeUpdateHistory(Oldid, Newid, Updatetype)
1. oldid is the identifier of the old zone that splits, newid is the identifier of the newly obtained zone for this node.
2. if (updatetype="split") {id=newid; newid.parent=oldid oldidlist.add(oldid)}
3. if (updatetype="merge") {id=newid; newid.parent=oldid.parent.parent oldidlist.delete(oldid)}

Figure 9:
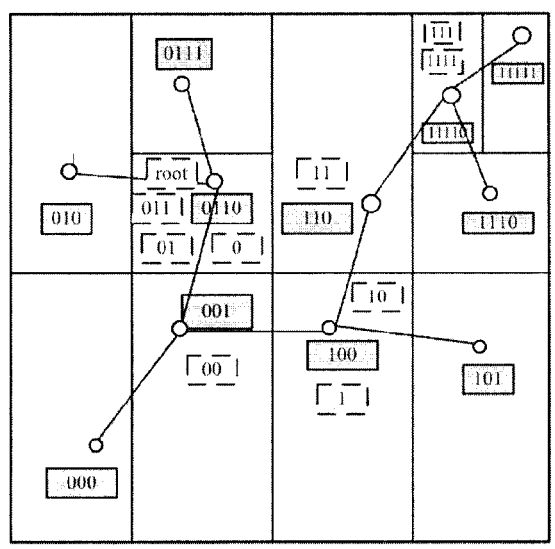
FIG. 9 illustrates the construction of an index tree using a history method.

FIG. 9 shows the construction of index tree in a 2-d sensor network scenario. The identifier of each node is shown in the darker gray rectangle. The virtual identifiers held by a node is shown in dotted lighter gray rectangles. The arrows connect parents with children in the index tree.

The situation can become much more complex when sensors 102 in the NOS 100 are mobile or disconnected. The movement of sensors can affect their reachability with other nodes and disrupt the connectivity of the index tree. A dynamic update method can be designed for index tree adjustment caused by mobility of sensors 102. When a sensor 102 detects that the connection with its parent node in the index tree has been lost, it sends a "readjust" message with its own information, virtual identifier list, and lost parent's identifiers to its children in its sub-tree.

The following pseudo-code describes the dynamic update method running at node n, which can be invoked when connection becomes "false". Each node keeps a neighborlist with all its neighbors' identifier, virtual identifiers information, and parent node identifiers in the index tree.

Function: IndexTreeUpdateDynamic(Initiator)
    1. if (initiator=self) {initiate message reAdjustTree(id, oldidlist, parentlost) and send it to children;}
    2. Upon receiving reconnect message from node m: parent=m; delete all lostid from oldidlist.
    3. Upon receiving reAdjustTree message from node m: check if ((parentlost belongs to any of its neighors) or (parentlost belongs to any of its neighbors' parent))
    4. if yes, send reconnect(n) to m;
    5. parent=the neighbor that holds parentlost or whose parent holds parentlost;
    6. Add lostid to oldidlist.
    7. if no, forward reAdjustTree message to children attaching n's own information id, oldidlist The discussion of index-tree driven in-network aggregation follows. In this subsection a description is provided for how to use index tree and underlying index structure to provide substantial energy savings when doing aggregate queries. A review is provided on the five most common types of aggregation operations: MIN, MAX, AVERAGE, COUNT and SUM.

For MIN/MAX type of aggregations, the MIN/MAX value is always stored in the sensor 102 that has the smallest/largest zone identifier within the query range, according to the intrinsic characteristics of indexing structure. When processing this type of aggregations, the query is directed to a sensor 102 which performs data inspection. All other sensors do not need inspection and may only serve as routers in the query path. Data inspection is not necessary for all other sensors on the path. Once the query reaches this sensor, it searches its local storage and returns the query result.

For other aggregation types such as SUM, AVERAGE and COUNT, the index tree is exploited for their calculation. When a query q is issued, the scope of the query is examined first. The query key qk(q) for the aggregation is then calculated by the prefix method introduced in the query processing section. This query key corresponds to a node in the index tree, usually an intermediate node. The sub-tree of this node should be searched for this query result because all nodes in this sub-tree share the same query key as common prefix. Query q is then routed toward the node holding identifier qk(q). When a node receives q and discovers a match between one of its identifiers and qk(q), it declares itself an aggregation root of q and begins to process it. For COUNT/SUM/AVERAGE type of aggregations, summaries can be maintained at each node along the index tree.

Prior art systems have built a centralized scheme to support probabilistic query processing using approximations with probabilistic intervals of confidence. It has been observed that the indexing tree itself captures the goal of a statistical model in that queries are approximated and a specific confidence level is assessed within the indexing tree itself without having to examine the actual raw data stored at the sensors 102. The index tree for aggregation and approximation is thus the by-product of the self-emerging distributed data structure formed by position region data space method described above. Unlike the approaches in prior art systems, no flooding for index tree construction is required.

In approximated aggregation, the number of data items at each sensor n is recorded as count(n). The query generated at the source node s is directed to the node in the index tree that is the root of the subtree containing all the nodes to be enquired. (The root's identifier can be calculated as the common prefix of the query range). The value of all the tuples stored at each sensor 102 can be approximated by the middle point of the data range in quest indicated in the sensor's identifier I(n). Say, the query covers the value in dimension A1. The middle point of the data range at sensor n can be determined by first obtaining the minimum and maximum values in dimension A1 that is within the sensor's range of storage, and then finding the middle point of the two values.

The partial result of aggregation can then be approximated using the middle point and propagated back along the tree. Thus, if time and energy requirements are very stringent and accuracy can be sacrificed a little bit for the extra time gain, the approximate aggregation can be very quick in response to queries.

It would be evident to an artisan with ordinary skill in the art that the aforementioned embodiments can be modified, reduced, or enhanced without departing from the scope and spirit of the claims described below. Accordingly, the reader is directed to the claims below for a fuller understanding of the breadth and scope of the present disclosure.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   a first sensor locating itself in a geographic space of a network of sensors; and
   according to the location determined by the first sensor, the first sensor assigning itself a first zone within a portion of the geographic space and a corresponding data range for storing sensed information.

2. The method of claim 1, comprising the first sensor locating itself in the geographic space according to ranging information obtained from one or more signals associated with at least one neighboring sensor belonging to the network of sensors.

3. The method of claim 2, wherein the one or more signals comprise at least one among electrical signals, electromagnetic signals, optical signals, and acoustic signals.

4. The method of claim 1, wherein the first sensor is mobile, and wherein the method comprises the first sensor repeating the aforementioned steps when it transitions to a second zone.

5. The method of claim 4, wherein a second sensor has assigned itself to the second zone prior to the first sensor transitioning to said second zone, and wherein the method comprises the second sensor reassigning itself a new zone and corresponding data range upon detecting the first sensor entering the second zone.

6. The method of claim 4, wherein a third sensor belongs to a third zone adjacent to the first zone, and wherein the method comprises the third sensor reassigning itself a new zone and corresponding data range upon detecting that the first zone is unoccupied.

7. The method of claim 1, wherein information sensed by the first sensor comprises one or more attribute values that form a tuple, and wherein the data range comprises a range of attribute values for storing tuples.

8. The method of claim 1, comprising:
the first sensor sensing information;
in response to the first sensor detecting that the sensed information is within the data range of the first zone, the first sensor storing the sensed information;
in response to the first sensor detecting that the sensed information is not within the data range of the first zone,
the first sensor mapping the sensed information to a location in the geographic space according to one or more values of the sensed information;
the first sensor selecting a second sensor from the network of sensors according to the location given to the sensed information;
the first sensor transmitting the sensed information to the second sensor, wherein the second sensor operates in a second zone with a corresponding data range for storing sensed information which the second sensor assigned to itself according to its location in the geographic space;
repeating a portion of the aforementioned steps at each sensor receiving the sensed information of the first sensor until the sensed information is stored at one of the sensors in the network of sensors having a data range corresponding to the sensed information.

9. The method of claim 8, comprising the first sensor selecting the second sensor from a group of neighboring sensors according to a distance between each of the neighboring sensors and the location given to the sensed information of the first sensor.

10. The method of claim 8, wherein information sensed by sensors of the network of sensors corresponds to at least one among a group of recordable information types comprising environmental information, medical information, public information, instrumentation information, commercial information, audio information, image information, and location information.

11. The method of claim 8, comprising each sensor in the network of sensors assigning itself a corresponding zone and associated data range for storing sensed information according to its location in the geographic space, wherein the self-assigned zones and associated data ranges correspond to an arrangement in the network of sensors that reduces a cost for a computing device coupled to said network of sensors to retrieve a portion of information sensed by said sensors.

12. The method of claim 8, comprising each sensor in the network of sensors assigning itself a data management task, wherein the self-assigned data management tasks of the network of sensors forms a data aggregation structure.

13. The method of claim 12, comprising each sensor in the network of sensors generating an identifier that delineates the zone, the data range, and the data management task of said sensor.

14. The method of claim 11, wherein the arrangement comprises one or more clusters of sensed information having similar values stored in one or more proximately located sensors of the network of sensors.

15. The method of claim 1, comprising:
the first sensor detecting a margin of error in localizing itself that exceeds a threshold; and
the first sensor applying a refined localization method to improve the margin of error.

16. The method of claim 1, wherein the network of sensors comprises at least one among a plurality of fixed wireless sensors, mobile wireless sensors, fixed wired sensors, and mobile wired sensors.

17. A computer-readable storage medium in a sensor belonging to a network of sensors operating in a geographic space, comprising computer instructions for locating itself in the geographic space, and assigning itself according to its location a zone within a portion of the geographic space and a corresponding data range for storing sensed information.

18. The storage medium of claim 17, comprising computer instructions for locating itself in the geographic space according to ranging information obtained from one or more signals associated with at least one sensor belonging to the network of sensors.

19. A sensor belonging to a network of sensors operating in a geographic space, comprising a controller that manages a sensing device, wherein the controller is programmed to locate itself in the geographic space, and assign itself according to its location a zone within a portion of the geographic space and a corresponding data range for storing sensed information.

20. The sensor of claim 19, wherein the controller is programmed to locate itself in the geographic space according to ranging information obtained from one or more signals associated with at least one sensor belonging to the network of sensors.

* * * * *